Sept. 27, 1966    H. W. ALYEA ETAL    3,275,031
DAMPERS AND SEAL MEANS THEREFOR
Filed Jan. 29, 1963    4 Sheets-Sheet 1
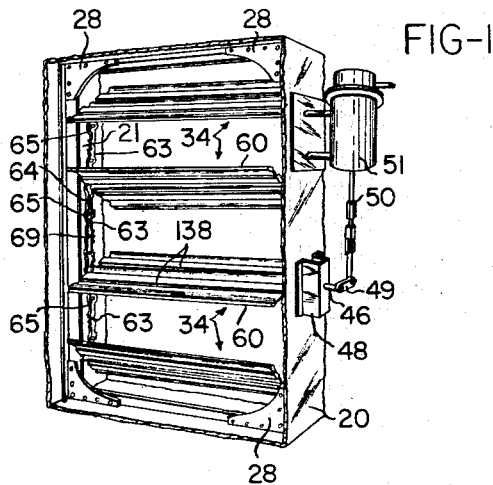
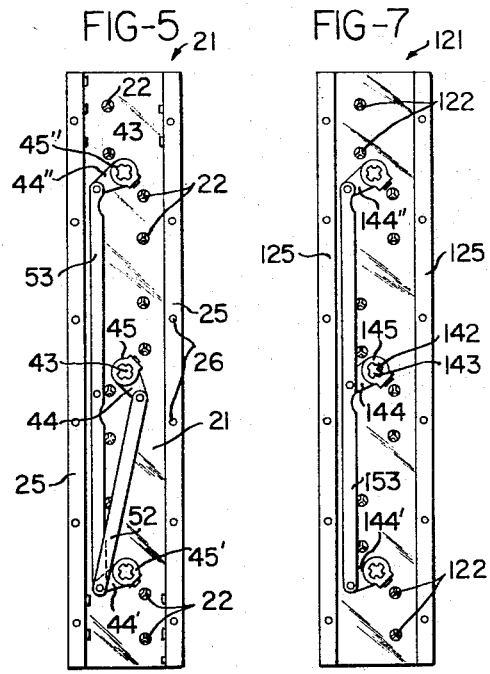
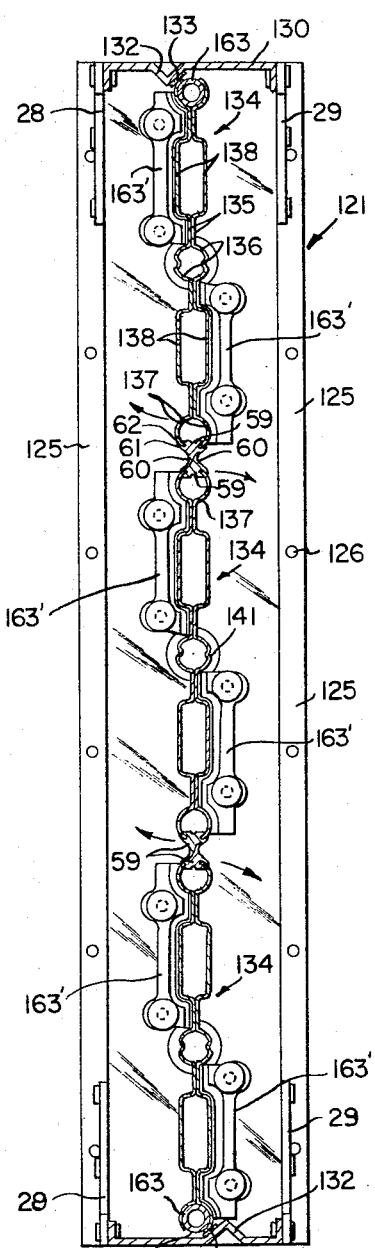
INVENTORS
Harold W. Alyea
Edward D. Jurasinski
BY Eugene V. Fliss
Morsell & Morsell
Attorneys Sept. 27, 1966  H. W. ALYEA ETAL  3,275,031
DAMPERS AND SEAL MEANS THEREFOR
Filed Jan. 29, 1963  4 Sheets-Sheet 2

INVENTORS
Harold W. Alyea
Edward D. Jurasinski
BY Eugene V. Flios
Morsell & Morsell
Attorneys

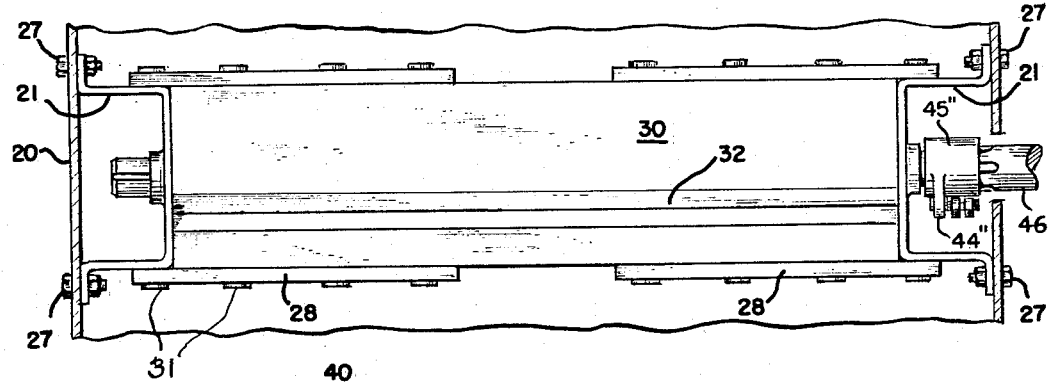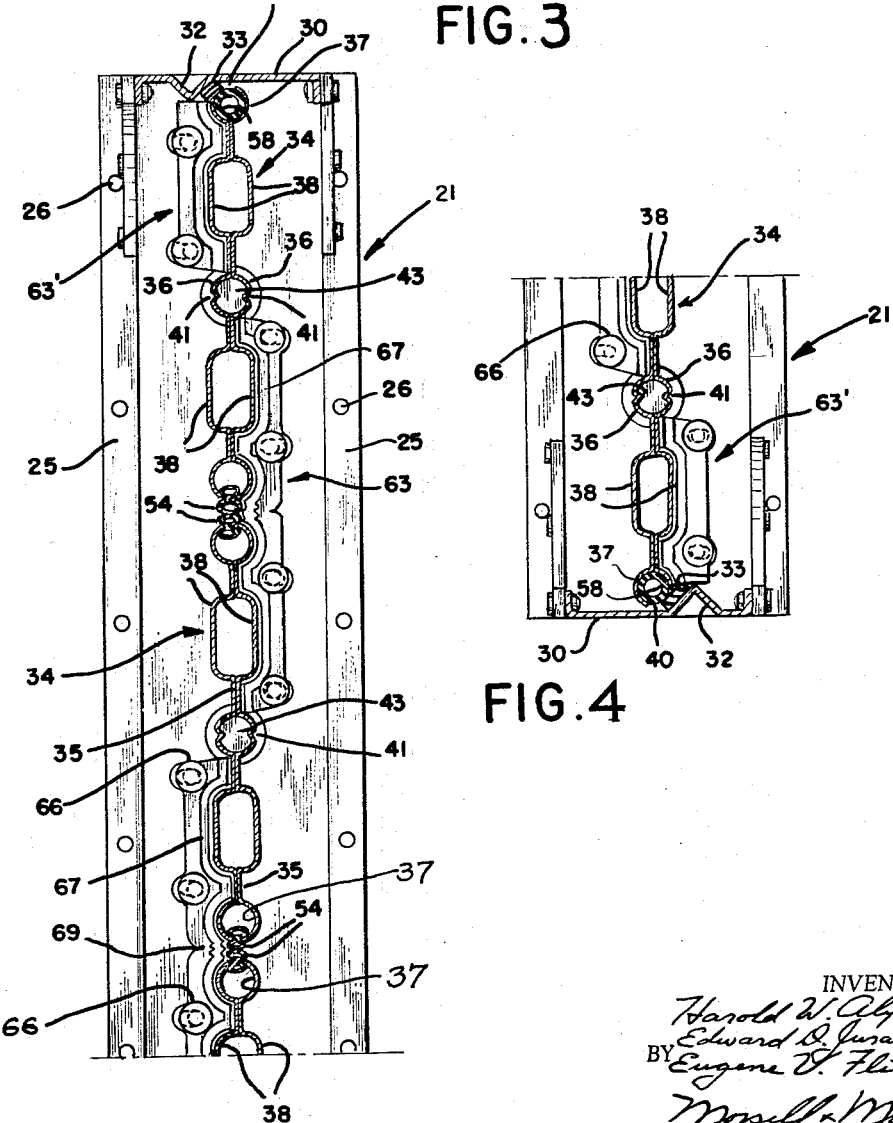

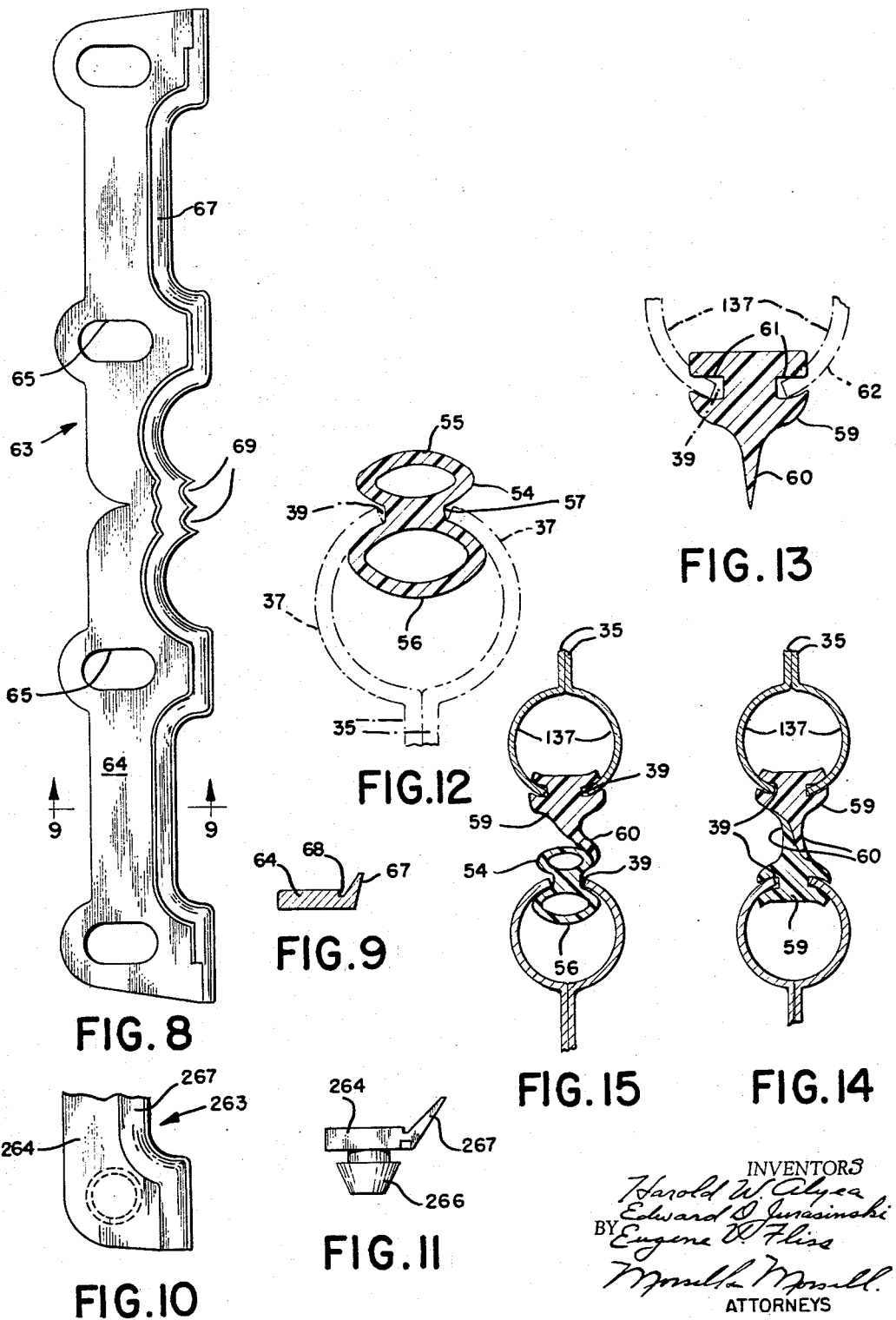

United States Patent Office 3,275,031
Patented Sept. 27, 1966

3,275,031
DAMPERS AND SEAL MEANS THEREFOR
Harold W. Alyea, Waukesha, and Edward D. Jurasinski and Eugene V. Fliss, Milwaukee, Wis., assignors to Johnson Service Company, Milwaukee, Wis., a corporation of Wisconsin
Filed Jan. 29, 1963, Ser. No. 254,671
11 Claims. (Cl. 137—601)

This invention relates to improvements in dampers.

In air conditioning systems for buildings involving heating and/or cooling, it is necessary, to use dampers at various locations in the air ducts. Due to the fact that the ducts vary in size according to requirements, the sizes of damper units to fit the various ducts are unlimited. Heretofore the providing of dampers of an unlimited range of sizes has involved substantial expense, and in many cases, required special construction, making it impossible to use high production tooling.

It is a general object of the present invention to provide novel damper structure which makes it possible to provide a sufficient assortment of standard size dampers, using modular construction, so that all sizes can be made from a relatively small number of standard parts, thereby justifying high production tooling. The high production tooling makes possible designs of various components not practical otherwise, and permits closer tolerances to be maintained. Both of these factors permit new concepts of damper design to be employed.

Dampers of the type with which the present invention is concerned commonly involve multiple blades which coact at the edges with one another to close an opening, it commonly requiring three or four blades to control flow through a duct. With the present invention novel means has been provided for creating seals between the meeting edges of the dampers and between edges of the dampers and the casing, said means making it possible to compensate for tolerance variation between damper blades and thus take up any tolerances which may occur.

A further object of the invention is to provide an improved damper construction for multiple blade dampers, wherein the damper unit includes end channels within which interconnecting links for the damper blades are located, whereby said links are kept out of the air stream.

A further object of the invention is to provide an improved damper blade formed of like opposed, back-to-back sheet metal halves which are of novel channeled shape in cross-section, said shape providing structural strength and rigidity, providing an integral cylindrical socket for the damper shaft or trunnions, and providing novel means at the edges of the blades for detachably receiving flexible sealing elements, the said blade construction providing for ease of assembly and the trunnion sockets serving to accurately locate the trunnions in assembly.

A more specific object of the invention is to provide a damper blade construction, as above described, in combination with novel edge seals which have the cross-sectional shape of a figure 8, and which includes spaced longitudinal beads, one of which is of greater size than the other, the beads being interchangeable in position to provide a variation in effective seal height in order to further compensate for tolerance variations between the damper blades.

A further object of the invention is to provide an improved damper construction, as above described, including flexible end seals shaped to cooperate with the cross-sectional shape of the damper blades and interfitting therewith, and being flexible to take up various tolerances which may exist, said end seals being capable of being stocked in a number of basic sizes, lengths, and shapes for use as required in assembling a particular damper.

With the above and other objects in view, the invention consists of the improved damper and all of its parts and combinations, as set forth in the claims, and all equivalents thereof. In the accompanying drawings, illustrating several preferred embodiments of the invention:

FIG. 1 is a perspective view of an opposed-blade damper, with the blades in almost fully-opened condition, the damper illustrated in FIG. 1 having four blades in two opposed pairs;

FIG. 3 is a top view of the damper unit of FIG. 4, a portion of a duct being shown in horizontal section;

FIG. 4 is a sectional view, taken on the line 4—4 of FIG. 2;

FIG. 5 is a side elevational view of an opposed-blade damper unit, with its end channel open, before installation in a duct;

FIG. 6 is a view similar to FIG. 4 showing the arrangement for a parallel-blade damper;

FIG. 7 is a view similar to FIG. 5, showing the end linkage for a parallel-blade damper;

FIG. 8 is a plan view of a typical end seal for coaction with a pair of damper blades as used in the arrangement of FIG. 4;

FIG. 9 is a sectional view, taken on the line 9—9 of FIG. 8;

FIG. 10 is a fragmentary view near one end of a modified type of end seal, for alternative use in lieu of the end seal of FIG. 8;

FIG. 11 is an end view of the seal of FIG. 10;

FIG. 12 is a cross-sectional view of one of the edge seals used in the opposed-blade damper;

FIG. 13 is a cross-sectional view of one of the edge seals as used in conjunction with the parallel-blade dampers of FIG. 6;

FIG. 14 is a fragmentary cross-sectional view showing the edge portions of cooperating parallel damper blades, showing how two of the seals of FIG. 13 coact in closing position; and FIG. 15 is a view like FIG. 14, showing a modified arrangement.

THE DAMPER CASING

Figure 2:
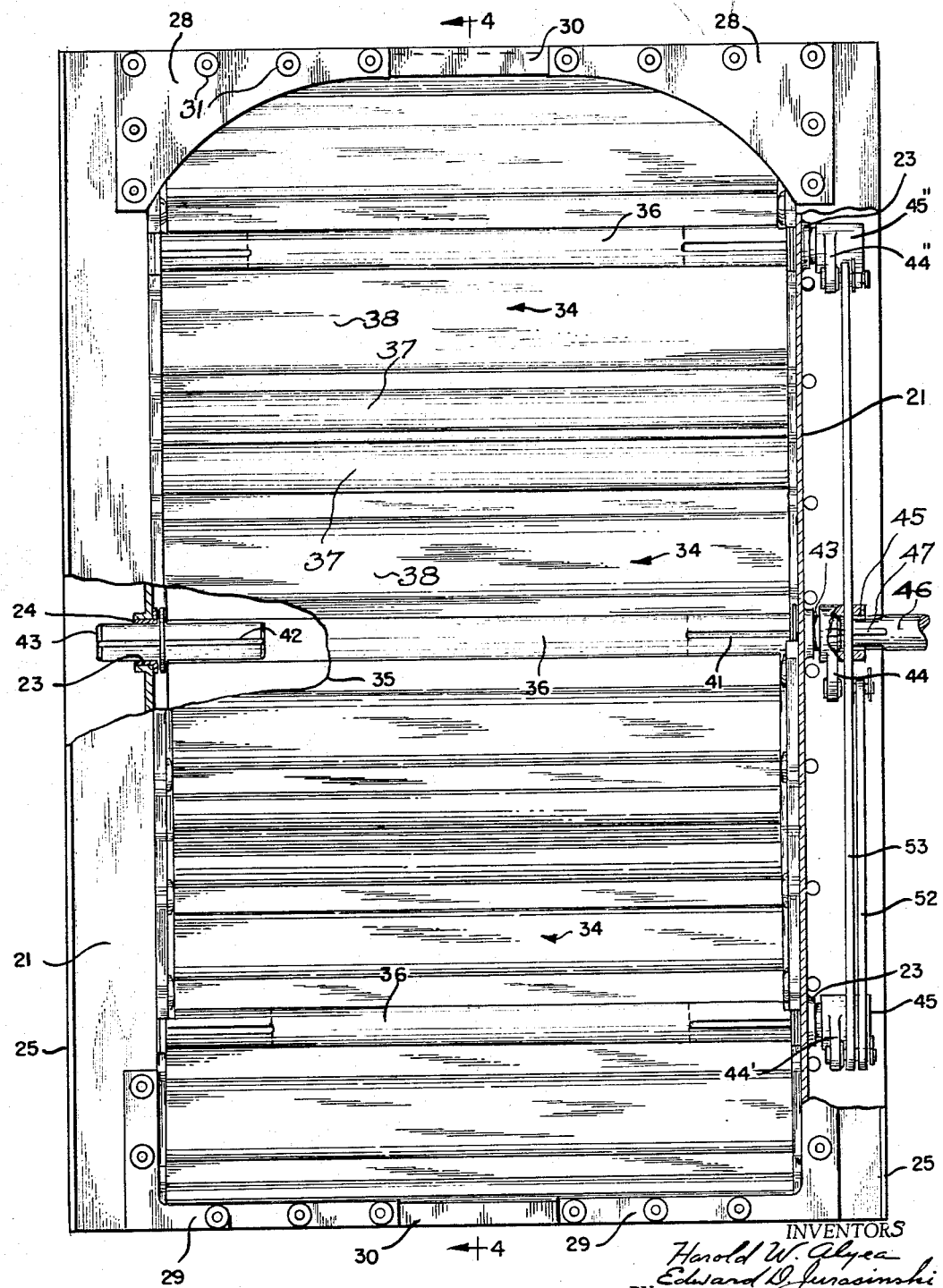
FIG. 2 is a front elevational view of a damper unit, parts being broken away and shown in section.

Referring more particularly first to FIGS. 1–5 of the drawings, the numeral 20 designates a fragment of a duct such as is used in heating and air conditioning systems, the duct being of rectangular cross-section. Secured to the sides of the duct in opposed position are end channels 21 (see FIGS. 4 and 5). The bases of these end channels may be pre-formed with various openings 22 for use in securing the end seals in position, as will be hereinafter explained, and with various trunnion openings 23 which may be flanged as illustrated in FIG. 2 and fitted with bearings 24. In addition, the channels have reversely-directed attaching flanges 25 which may be provided with openings 26 for receiving attachment bolts 27, by means of which the end channels may be secured in a desired location in a duct.

As shown in FIGS. 2 and 4, there may be corner brackets 28 and 29 which are bolted to the sides of the end channels 21 and to flanges of top and bottom channels 30, as at 31. As shown in FIG. 2, the said brackets on one face of the damper, at the top, are of generally triangular shape, as at 28, and the opposite corner brackets 29, at the top, are L-shaped so as not to obstruct swinging movement of the damper blade. At the bottom of the unit the corner brackets 28 and 29 are reversed as to sides, as is clear from FIGS. 2 and 4. The top and bottom channels are each formed with integral ribs 32 forming damper stops, which ribs are V-shaped in cross-section and preferably fitted with flat rubber strips, as at 33, to provide cushioned stops for the edges of the damper blades, as will be hereinafter described.

The damper of FIGS. 2–5, inclusive, is three-bladed, but it is understood that any number of blades may be employed to fill the particular cross-sectional dimension of the duct, and these blades may be furnished in a number of standard lengths and widths which may be combined as desired to achieve a required size.

THE BLADES

Each damper blade 34 comprises opposed like sheet metal halves 35 stamped to provide the cross-sectional shape shown in FIG. 4. This shape on each half includes a semi-cylindrical trunnion groove 36 midway of the height of the damper blade, and a semi-cylindrical edge groove 37 on each edge. Between the center trunnion groove 36 and each seal-receiving groove 37 is a strengthening channel 38. Pairs of the sheet metal halves are welded together, or otherwise connected between the channels, in back-to-back relationship, as illustrated in FIG. 4, to provide a full cylindrical portion 36—36 providing end sockets for the trunnions, and said strengthening channels providing relatively large hollow strengthening ribs 38—38. The construction also provides edge cylindrical portions 37—37. The extreme edges of the cylindrical portions 37 are cut off as desired to provide edge slots 39 and 40, the purpose of which will be hereinafter described.

In stamping the cylindrical portions 36, they are preferably formed with longitudinal indentations 41 near the ends, to provide integral keys for coaction with keyways 42 in trunnions 43 which are inserted in the cylindrical trunnion-receiving sockets 36—36. These trunnions have projecting ends which are journalled in the bearings 24 and which project into the space within the end channels 21, as is clear from FIG. 2. In FIG. 2, three of the damper blades are shown as installed, with three sets of trunnions. In the installation of FIG. 1, there are four damper blades in two opposed pairs.

OPERATING MECHANISM

The blades may be linked together for a desired type of movement in numerous ways, depending upon the number of blades and the operating characteristics desired for the damper, and also depending upon whether an opposed-blade damper is desired for the particular location, or a parallel-blade damper. One type of linkage is illustrated in FIGS. 2 and 5 and is all contained in the end channel 21 on one side. Here it will be seen that for each of the blades there is a torque arm 44 having a keyed socket portion 45 for receiving the grooved end of a trunnion 43, on one end. The trunnion only extends part way into the socket portion 45, as illustrated in FIG. 2, whereby a selected one of the sockets 45 may be connected to an operating mechanism.

In the construction illustrated, an extension shaft 46, having an end with keyways 47, is inserted in the socket of the intermediate torque arm to project rotatably through the wall 20 of the duct. As shown in FIG. 1, this extension shaft 46 may project through a bearing formed in the side of a box 48 secured to the outer side of the duct, and the outer end of the extension shaft may have a crank 49 thereon connected to a crank arm 50 leading from a suitable operator 51, which may be a remotely-controlled pneumatic motor. In the arrangement of FIGS. 2 and 3, the intermediate torque arm 44 is connected by a link 52 with the lower torque arm 44', and the latter is connected by a link 53 with the upper torque arm 44". As before mentioned, this linkage arrangement may be varied, depending upon the number of blades and the operating characteristics desired for the damper. Also, other types of inter-connections may be employed to obtain desired damper opening and closing characteristics.

In FIGS. 6 and 7, a damper blade and linkage arrangement for parallel-blade dampers is illustrated. Here the torque arms 144, 144' and 144" are all connected by a common link 153 to provide for parallel movement of the damper blades. In FIGS. 6 and 7, all parts which correspond to like parts in FIGS. 4 and 5 are designated by the same numerals preceded by the digit 1, and will not again be described in detail.

THE EDGE SEALS

Inasmuch as a tight seal between the meeting longitudinal edges of the blades is very desirable, it is a feature of the invention to provide a simple way for providing edge seals to compensate for tolerance variations between damper blades and thus take up any tolerances which may occur. A type of seal which is used between the coacting edges of opposed-blades is illustrated in FIGS. 4 and 12 and is designated generally by the numeral 54. These seals are formed of lengths of suitable flexible material. Extruded vinyl compound has been found to give good results, but other synthetic materials may be employed, or natural rubber. In cross-section these seals preferably have the form of a figure 8 and include longitudinally-extending beads 55 and 56, defined by grooves 57. The beads are preferably hollow, as illustrated in FIG. 12, to facilitate insertion of one of the beads in the slot 39 provided at the outer edge of the cylindrical seal-receiving portions 37—37, the arrangement being such that the metal edges of the two halves of the blade engage in the grooves 57. Thus, simple installation of the seals is provided for. In order to provide for major variations in tolerances, one of the beads 55 has been made substantially smaller in cross-section than the bead 56. By selecting which bead is to project outwardly, a substantial change in seal height may be accomplished.

When two seals of the type just described move to the closing position of FIG. 4, they will engage each other somewhat before final closing position and then will move together into the position of FIG. 4, with a certain amount of compression of the seals taking place, there being substantially no friction between seals in the action of the opposed-blade damper.

For edges which are adjacent the top and bottom members 30 it is preferred to accomplish the sealing action by permitting one side of the semi-circular blade edge to yieldingly coact with rubber seals 33 in the manner shown in FIG. 4. Circular flexible insert members 58 in the top and bottom blade edges serve to reduce air noises, by preventing air flow over the sharp blade edges.

For parallel-blade dampers of the type illustrated in FIGS. 6 and 7, edge seals of the type shown in FIG. 12 would provide too much friction, as adjacent blade edges move in opposing directions toward closing position. For parallel-blade dampers it is, therefore, preferred to employ seals 59 which have projecting longitudinal fins 60 and which have base portions with grooves 61 for receiving the edges 62 of the cylindrical portions 137 of the blade halves. This modified form of seal may be formed of similar material to that used for the seal of FIG. 12, it again being preferred to use an extruded vinyl compound. When the seals meet in closing position, as shown in FIG. 14, the fins 60 flex somewhat in contact, as shown in FIG. 14, thus allowing for certain tolerance in blade straightness. Air pressure acting against this seal tends to increase its sealing ability.

If desired, it is satisfactory, with a parallel-blade damper of the type shown in FIG. 6, to employ a seal of the type shown in FIG. 13 on the edge of one blade, and a seal such as that of FIG. 12 on the meeting edge of the adjacent blade for closing coaction in the manner shown in FIG. 15. This alternative arrangement presents the possibility of reversing the position of the seals 54 to compensate for variations in tolerances.

THE END SEALS

In order to take up the various tolerances which may exist and to provide a tight seal at the ends of the damper blades, the end seals illustrated in FIGS. 4 and 6 and in FIGS. 8 and 10 may be employed. Referring first to FIGS. 4 and 8, there is illustrated a seal 63 formed of a molded strip of suitable synthetic material, such as Neoprene or other flexible material having required characteristics. The end seal of FIG. 8 includes a base 64 having a plurality of transverse slots 65 for receiving push studs 66 which may be engaged in selected openings 22 of the end channels. By having the slots 65, the lateral position of each end seal may be adjusted to suit conditions. Each of the end seals 63 includes an outwardly flanged sealing edge or fin 67 paralleled by a base groove 68 which renders it more flexible. The fin 67 has an outline to fit the contour of the damper blades, as illustrated in FIGS. 4 and 8. This contour on the end seal of FIG. 8, in addition, has recesses 69 for receiving end portions of the beads 55 or 56 of the edge seals, as shown in FIG. 4. When the damper blades are in the closed position of FIG. 4, all portions thereof fit snugly against the contoured flange 67, the latter flexing somewhat to allow for tolerances and provide a tight seal. Shorter seals for coaction with portions of a single damper, usually at the top and bottom, may be provided, as shown at 63' in FIG. 4. Except for the length and edge contour, these seals are essentially the same as the seals 63. For the parallel-blade damper of FIG. 6, only short seals 163' are employed. This is due to the difference in type of movement of the dampers.

A modification of the end seal of FIG. 8 is illustrated in FIGS. 10 and 11. This seal is essentially the same as the seals 63 or 63' of FIGS. 4 and 8, except that the slots 65 are not employed and the base portion 264 has integral molded attachment buttons 266 with enlarged flexible heads. These buttons are formed of the same material as the end seal, and may be pressed through the end channel openings 22, the enlarged heads expanding on the opposite side of the metal to hold the end seals in position. Like parts of the end seal of FIGS. 10 and 11 are designated by the same numerals used in FIG. 8, preceded by the digit 2.

OPERATION

In operation of the damper of FIGS. 2-5, inclusive, when the remotely controlled operator 51 (see FIG. 1) is caused to operate it will cause rotation of the trunnion 43 to which the extension 46 is connected. Because of the linkage 52 and 53 with the other torque arms, such rotation will cause simultaneous opening or closing of all of the damper blades, as indicated by the arrows in FIG. 4 and as shown in FIG. 1. These dampers may, of course, be opened to any extent required, depending upon conditions. In FIG. 1 the damper blades are nearly fully open. In FIGS. 2 and 4 the blades are completely closed. During closing movement, the seals 54 at meeting edges of adjacent dampers will move into engagement just short of closing and will then be compressed somewhat, due to the hollow construction of the seals, as the dampers move into the fully-closed position of FIG. 4. This will be accomplished without substantial friction because of the type of blade movement of FIG. 4 and because of the construction of the seals. The hollow flexible seals 40 at the top and bottom edges will compress somewhat when engaging the strip seals 33 on the top and bottom channel ribs 32. At the same time the flanges 67 or 267 of the end seals will flex to provide a tight seal against the contours of the damper blades and the ends thereof.

In the parallel-blade damper of FIGS. 6 and 7, the adjacent blade edges move in reverse directions. If seals of the type of FIG. 12 were used in the arrangement of FIG. 6, there would be too much friction on closing movement. By employing the finned seals 59, the meeting edges may move to the closing position of FIGS. 6 and 15 without substantial friction, there being a slight flexing of the fins in final position.

From the above it is apparent that a very simple form of damper blade has been provided, which may be fabricated by joining two like stamped sheet metal halves in back-to-back relationship. It is also apparent that this construction provides for structural strength and rigidity and provides pre-located sockets for the damper trunnions, together with integral keying means. With this type of blade design, blades can be readily furnished in standardized lengths and widths so that a plurality of selected blades may be combined in various ways to provide a damper unit for practically any requirement. It is also apparent that locating holes may be provided in the end channels in such a way that assembly of the blades in proper relationship is ensured. By having the end channels formed, as shown, the operating linkage is confined, and is out of the air stream.

It is also apparent that edge seals and end seals have been provided which can be readily inserted and used in any combination desired to suit the particular damper design, and to provide tight seals between coacting damper edges and at the damper ends.

Various changes and modifications may be made without departing from the spirit of the invention, and all of such changes are contemplated as may come within the scope of the claims.

What we claim is:

1. A damper blade comprising like sheet metal halves each formed with opposite edge seal-receiving grooves which are parallel to each other, the halves being so positioned and secured in back-to-back relation that the edge seal-receiving grooves cooperate to provide tubular seal receptacles, the outer edges of said seal-receiving grooves terminating short of meeting to provide slots of less width than the cross-sectional size of said seal receptacles, trunnions projecting from the end edges of the blade intermediate the grooves, and elongated flexible sealing members having enlarged cross-sectional portions in said receptacles and having external sealing portions projecting from said slots and of enlarged cross-section beyond the slots, at least one of said sealing members of each blade having its enlarged cross-sectional portions of different size, and said seal receptacles being of a cross-sectional size to receive either of said enlarged cross-sectional sealing member portions, whereby the sealing member is interchangeable in position to vary the amount which projects externally of the seal receptacle to thereby compensate for tolerance variations.

2. A damper comprising a frame including channel-shaped side members with the web portions of the channels facing each other, a plurality of cooperating blades each having a corrugated cross-sectional contour and each blade having outer edge seal-receiving grooves, trunnions projecting from opposite ends of said blades and journalled in said web of the frame side channels to pivotally mount said blades in cooperating relationship in the frame, common operating means in the channel of one of said channel-shaped side members for causing simultaneous opening and closing movement of the blades, and elongated flexible sealing members removably supported in said seal-receiving grooves having portions projecting from the grooves, adjacent projecting portions of the sealing members of adjacent blades being positioned to seal against one another when the blades are closed, at least one sealing member of each pair having a portion of one cross-sectional dimension confined in the groove and having a portion of a different cross-sectional dimension projecting externally from the groove, and said groove being of a size to receive either of said sealing member portions whereby said sealing member is interchangeable in position to vary the amount which it projects from the groove to compensate for tolerance variation.

3. A damper comprising a frame including spaced side members, a plurality of cooperating blades, each having a corrugated cross-sectional contour to provide inner and outer corrugated faces, trunnions projecting from the ends of said blades and rotatably mounted in said spaced side members to pivotally mount said blades in cooperating relationship in the frame, and end seals having base portions which are secured to the frame side members and having elongated flexible lips which project inwardly from the side members of the frame, said seals being so positioned that the lips are stoppingly engaged by face portions of the blades near the ends thereof when the damper is closed and said lips being so shaped as to sealingly fit the corrugated cross-sectional contour of the blades when the damper is closed.

4. A damper comprising a frame including spaced side members, a plurality of cooperating blades, each having a corrugated cross-sectional contour to provide inner and outer corrugated faces, trunnions projecting from the ends of said blades and rotatably mounted side members to pivotally mount said blades in cooperating relationship in the frame, the frame side channel members having locating openings therein, end seals having base portions and having elongated flexible lips which project inwardly from the side members of the frame, and fasteners securing the base portions of the end seals in said locating openings, said seals being so positioned that the lips are stoppingly engaged by face portions of the blades near the ends thereof when the damper is closed and said lips being so shaped as to sealingly fit the corrugated cross-sectional contour of the blades when the damper is closed.

5. A damper comprising a frame including spaced side members, a plurality of cooperating blades, trunnions projecting from the ends of said blades intermediate the height of each blade and rotatably mounted in said side members to pivotally mount said blades in cooperating relationship, and end seals having base portions which are secured to the frame side members and having elongated flexible lips which project inwardly from the said members of the frame, there being seals for each end of the blades with some seals mounted on one side of the blades and other seals mounted on the other side of the blades and said seals being so positioned that the lips are stoppingly engaged by face portions of the blades near the ends thereof when the damper is closed.

6. A damper comprising a frame including spaced side members, a plurality of cooperating blades, trunnions projecting from the ends of said blades intermediate the height of each blade and rotatably mounted in said side members to pivotally mount said blades in cooperating parallel blade relationship, and end seals having base portions which are secured to the frame side members and having elongated flexible lips which project inwardly from the side members of the frame, there being a pair of seals at each end of each blade with one seal mounted on one side of the blade below the trunnion and the other seal mounted on the other side of the blade above the trunnion and said seals being so positioned that the lips are stoppingly engaged by face portions of the blades near the ends thereof when the damper is closed.

7. A damper comprising a frame including spaced side members, a plurality of cooperating blades, trunnions projecting from the ends of said blades intermediate the height of each blade and rotatably mounted in said side members to pivotally mount said blades in cooperating opposed blade relationship, and end seals having base portions which are secured to the frame side members and having elongated flexible lips which project inwardly from the side members of the frame, there being a longitudinal series of end seals on each side member with alternate seals offset laterally from one another to be on opposite sides of the blades, and some seals being positioned to be engaged by a portion of one blade which is below its trunnion and also by a portion of an adjacent blade which is above its trunnion, and said end seals being so positioned that the lips are stoppingly engaged by face portions of the blades near the ends thereof when the damper is closed.

8. A damper blade comprising like sheet metal halves each formed with opposite edge seal-receiving grooves which are parallel to each other, the halves being so positioned and secured in back-to-back relation that the edge seal-receiving grooves cooperate to provide tubular seal receptacles, the outer edges of said seal-receiving grooves terminating short of meeting to provide slots of less width than the cross-sectional size of said seal receptacles, trunnions projecting from the end edges of the blade intermediate the grooves, and elongated flexible sealing members having enlarged cross-sectional portions in said receptacles and having external sealing portions projecting from said slots and of enlarged cross-section beyond the slots, at least one of said sealing members of each blade being 8-shaped in cross-section and having its enlarged cross-sectional portions of different size, and said seal receptacles being of a cross-sectional size to receive either of said enlarged cross-sectional sealing member portions, whereby the sealing member is interchangable in position to vary the amount which projects externally of the seal receptacle to thereby compensate for tolerance variations.

9. A damper comprising a frame including spaced side members, a plurality of cooperating blades, and trunnions projecting from the ends of said blades intermediate the height of each blade pivotally mounting said blades in cooperating relationship in said side members, each blade comprising like sheet metal halves and each half having a trunnion-receiving groove midway of its height and having parallel edge grooves on opposite edges which are parallel to said trunnion-receiving groove, said halves being secured in back-to-back relation to provide a trunnion-receiving tube and to provide tubular edge receptacles having edge slots, and an elongated edge member for at least one of said tubular edge receptacles, said edge member having an elongated connection portion within the tubular receptacle, having an elongated neck portion extending through the tubular receptacle slot, and having an elongated contact portion projecting externally from said neck portion in a position to engage the edge of an adjacent blade when the damper is closed.

10. A damper as claimed in claim 9 in which there is an elongated edge member for each tubular edge receptacle.

11. A damper as claimed in claim 10 in which the contact portion of the elongated edge member on at least one edge of a blade is flexible.

References Cited by the Examiner
UNITED STATES PATENTS

| | | | |
|---|---|---|---|
| 12,145 | 1/1885 | Ward | 189—62 |
| 2,510,429 | 6/1950 | Stanitz | 29—157.1 |
| 2,586,997 | 2/1952 | Shcach | 29—157.1 |
| 2,884,997 | 4/1959 | Honerkamp et al. | 137—601 |
| 2,926,400 | 3/1960 | Mandel | 20—62 |
| 2,976,884 | 3/1961 | Kurth | 137—601 X |
| 3,000,083 | 9/1961 | Byrant | 29—157.1 |
| 3,049,985 | 8/1962 | Klingberg | 137—601 X |
| 3,084,715 | 4/1963 | Scharres | 137—601 |

FOREIGN PATENTS 245,650   1/1962   Great Britain.

WILLIAM F. O'DEA, *Primary Examiner.*

D. LAMBERT, *Assistant Examiner.*

UNITED STATES PATENT OFFICE
CERTIFICATE OF CORRECTION

Patent No. 3,275,031 September 27, 1966

Harold W. Alyea et al.

It is hereby certified that error appears in the above numbered patent requiring correction and that the said Letters Patent should read as corrected below.

Column 7, line 19, after "mounted" insert -- in said frame --.

Signed and sealed this 22nd day of August 1967.

(SEAL)
Attest:

ERNEST W. SWIDER
Attesting Officer

EDWARD J. BRENNER
Commissioner of Patents